United States Patent [19]

Graves

[11] Patent Number: 4,557,306

[45] Date of Patent: Dec. 10, 1985

[54] CARBON BLACK-FURAZAN OXIDE PRODUCT AND RUBBER COMPOSITIONS CONTAINING SAME

[75] Inventor: Daniel F. Graves, Clinton, Ohio

[73] Assignee: The Firestone Tire & Rubber Company, Akron, Ohio

[21] Appl. No.: 621,656

[22] Filed: Jun. 18, 1984

[51] Int. Cl.$^4$ .................... C08C 4/00; C08K 5/35; C08K 3/04

[52] U.S. Cl. .................. 152/548; 106/288 B; 106/307; 106/308 B; 524/87; 524/89; 524/91; 524/92; 524/94; 524/496; 525/237; 525/347; 525/375; 525/377; 525/381

[58] Field of Search .............. 524/89, 91, 92, 94, 524/87, 496; 525/194, 237, 347, 375, 377, 381; 152/330 R; 106/288 B, 307, 308 B

[56] References Cited

U.S. PATENT DOCUMENTS

| | | |
|---|---|---|
| 2,424,199 | 7/1947 | Ter Horst . |
| 2,905,582 | 9/1959 | Coleman . |
| 2,974,120 | 3/1961 | Miller . |
| 3,528,098 | 9/1970 | Shaw . |
| 3,931,106 | 1/1976 | Crosby ............................. 528/10 |
| 3,931,121 | 1/1976 | Davis . |
| 4,024,327 | 5/1977 | Diefenbach . |
| 4,185,018 | 1/1980 | Fah . |

FOREIGN PATENT DOCUMENTS

| | | |
|---|---|---|
| 2534400 | 2/1977 | Fed. Rep. of Germany . |
| WO83/04031 | 11/1983 | PCT Int'l Appl. . |
| 2010850 | 7/1979 | United Kingdom . |
| 1586861 | 3/1981 | United Kingdom . |

OTHER PUBLICATIONS

Rehner & Flory, Ind. & Eng. Chem. 38, pp. 500 et seq.
Rubber Chem. & Tech. 49, p. 119, (1976).
Tanka, Kogyo Kagah Zasshu 74(8), 1701-6.

*Primary Examiner*—Herbert J. Lilling
*Attorney, Agent, or Firm*—Daniel N. Hall

[57] ABSTRACT

Carbon black products useful in rubber compositions, and rubber compositions (uncured or cured) containing said carbon black products are described. The carbon black products of the invention comprise carbon black having a surface area of at least 20 m$^2$/g. and up to about 10% by weight, based on the weight of the carbon black of at least one aromatic furazan oxide. Useful furazan oxides have both carbons of the furazan ring as part of a fused aromatic ring, and particular examples include benzofurazan oxide, and its methyl and methoxy analogs. Improvements in the processability of uncured rubber compositions containing the carbon black products of the invention have been observed.

Filled rubber vulcanizates containing the carbon black products of the invention exhibit many improved properties such as increased filler-rubber interaction and decreased hysteresis. Tires made from the vulcanizates prepared with the carbon black products of the invention show lower running temperatures and improved rolling resistance.

26 Claims, No Drawings

CARBON BLACK-FURAZAN OXIDE PRODUCT AND RUBBER COMPOSITIONS CONTAINING SAME

BACKGROUND OF THE INVENTION

This invention relates to improved modified carbon black products, to rubber compositions containing said products and to methods for improving the processability and/or reducing the viscosity of uncured rubber compositions. More particularly, the invention relates to modified carbon black products which, when incorporated into rubber formulations, result in rubbers exhibiting reduced viscosity and hysteresis without adverse affect on the tensile strength and modulus characteristics of the rubber.

It is known that rubber compositions generally are combined or "compounded" with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, published by John Wiley and Sons, New York (1970), particularly Vol. 12, page 280 and *The Vanderbilt Rubber Handbook*, R. T. Vanderbilt Company, Norwalk, Conn., 06855 (1968), particularly Sections 6, 7, 8, 9 and 11.

Vulcanizing agents, plasticizers, extenders, fillers, pigments, etc. generally are incorporated into vulcanizable rubber compositions so that the rubber can be cured or vulcanized in a mold to form useful articles. If often is necessary to include processing aids in rubber compound prior to molding and curing. These processing aids are primarily intended to improve the mixing of the ingredients of the rubber compound, the flowability of the rubber during processing, and the mold or mill release properties of the rubber, without seriously adversely affecting the properties of the cured rubber.

Carbon blacks are used in rubber formulations and vary widely as to their characteristics and combinations of characteristics. In rubber formulations, carbon black is used as a reinforcing filler. Many carbon blacks of the channel and furnace types with varying characteristics have been utilized because they impart varying desirable characteristics to the rubber. Among these various properties found in rubber is the resistance to oxidation or aging.

Benzofurazan oxides, and their analogs and isomers are known compounds, and many descriptions of them and procedures for their preparation have appeared. See, for example, Kaufman et al, "Chemical Reviews", Vol. 59, page 429 and following (1959) and Mallory et al, *Organic Synthesis* collective Vol. IV, pp. 74 and 75, John Wiley and Sons, New York (1963). The following U.S. patents also describe procedures for preparing furazan oxides of various types: U.S. Pat. Nos. 4,185,018 to Fah; 3,528,098 to Shaw; and 2,424,199 to Ter Horst. In considering previous descriptions of furazan oxides and related compounds, it should be noted that nomenclature used for these compounds has not been consistent, in part due to uncertainty as to their structures and predominant isomeric form. For example, they have been described as furazan oxides, as ortho dinitroso benzenes or di(nitrile oxides), isobenzofuroxans, benzofuroxans, benzofurazan-N-oxides and benzofurazan oxides. It is believed that the latter term is the modern and preferred nomenclature, and it shall be used in this specification and the appended claims.

Studies of furazan oxides and related compounds in rubber have been reported. For example, Rehner and Flory have indicated in *Industrial and Engineering Chemistry*, Vol. 38, page 500 et sec, that ortho dinitroso benzene is inactive in butyl rubber as a vulcanizing agent. In contrast, the para isomer is said to be very active. U.S. Pat. No. 3,931,121 to Davis et al, describes the curing of elastomeric polymers with poly(chloronitroso) compounds. U.S. Pat. No. 3,931,106 to Crosby et al, describes the use of dinitrile oxides, (generated in situ from furazans), in rubber cross-linking. British Pat. No. 1,586,861 describes the use of organic compounds which are sources of adjacent nitroso groups on a six-membered aromatic ring for modifying polymeric materials containing carbon-carbon unsaturation. Examples of such polymeric materials include polybutadiene, styrene-butadiene copolymers, butyl rubber, natural rubber and EPDM rubbers. The polymeric materials can contain fillers such as carbon black and fumed silica. Benzofurazan oxide is an example of a source material for the adjacent nitroso groups.

U.S. Pat. No. 2,974,120 to Miller describes the use of nonaromatic furoxans as antioxidants and antidegradants in rubber. U.S. Pat. No. 2,905,582 to Coleman et al, describes the use of nitroso compounds, including dinitroso compounds wherein the nitroso groups are on nonadjacent carbons in a method for bonding polyurethane resin to rubber bodies. Morita has described the use of N,4-dinitroso-N-methyl aniline as an active chemical promoter for carbon black reinforcement of IIR, NR and SBR. See *Rubber Chemistry and Technology*, Vol. 49, page 1019 and following (1976). Tanaka et al, have reported studies of nitroso benzene in rubber where chain cleavage was observed in Kogyo Kagaku Zasshi 74(8), pages 1701-6 (1971).

SUMMARY OF THE INVENTION

It now has been found that carbon blacks and aromatic furazan oxides can be incorporated into natural and synthetic rubber compositions in an improved manner by preforming a carbon black product which comprises carbon black and up to about 10% by weight, based on the weight of carbon black, of at least one aromatic furazan oxide of the partial formula

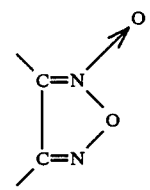 (I)

wherein the depicted carbon atoms are a part of a single fused aromatic ring. The above-described carbon black products are particularly useful for incorporating carbon black and a furazan oxide into uncured rubber compositions which comprise at least one rubber having an unsaturated carbon chain. The uncured rubber compositions into which the carbon black products of the invention have been incorporated generally exhibit desirably reduced viscosity and other beneficial properties such as improved processability, and enhanced strength when cured. Also, the carbon black products of the invention do not have the strong characteristic odor of the furazan oxide which facilitates handling and storage of these materials.

The carbon black products of the invention can be prepared by mixing a carbon black having a surface area (EMSA) of at least about 20 m²/g. with the desired amount of the aromatic furazan oxide, and the mixture can, if desirable, be converted into a pelletized form.

In another aspect of the invention, a filled vulcanizate made by vulcanizing a composition comprising at least one rubber having an unsaturated carbon chain, and a minor, cured property-improving amount of a carbon black product comprising carbon black having a surface area of at least 20 m²/g. and up to about 10% by weight, based on the weight of the carbon black, of at least one aromatic furazan oxide of the partial formula

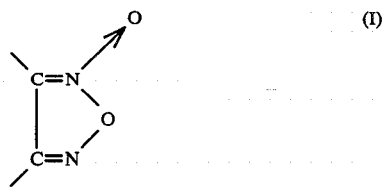  (I)

wherein the depicted carbon atoms are a part of a single fused aromatic ring, is improved in carbon black interaction, hysteresis, modulus, compression set and resiliency. Rubber articles and portions thereof made from such vulcanizate such as tires, hoses, belts, treads, side walls and the like are also within the scope of the invention as are methods for reducing the rolling resistance and running temperatures of such tires.

DETAILED DESCRIPTION OF THE INVENTION

The carbon black products of the present invention include any of the commonly available, commercially-produced carbon blacks having a surface area (EMSA) of at least 20 m²/g. and more preferably at least 35 m²/g. up to 200 m²/g. or higher. Surface area values used in this application are those determined by ASTM test D-1765 using the cetyltrimethylammonium bromide (CTAB) technique. Desirable results are not obtained with carbon blacks having less surface area such as the thermal carbon blacks. Among the useful carbon blacks are furnace blacks, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of useable carbon blacks are summarized in the following Table I.

TABLE I

Carbon Blacks

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the carbon black products of the invention may be in pelletized form or an unpelletized flocculant mass. Preferably, for more uniform mixing, unpelletized carbon black is preferred for preparing the carbon black product of the invention.

The carbon black product of the invention is prepared by mixing the carbon blacks with a desired amount of at least one furazan oxide. The furazan oxides used in this invention are fused aromatic, that is, they have an aromatic ring fused to the N-oxidized heterocyclic furazan ring. They are of the partial formula

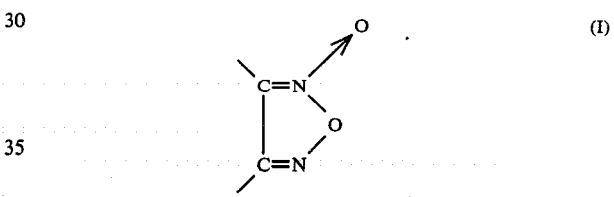

wherein the depicted carbon atoms are part of a fused, single aromatic ring. This aromatic ring can be carbocyclic such as a benzene ring or it may be heterocyclic, such as a pyridine ring. It can be the only additional ring in the furazan compound, or it can be part of a linked or fused ring system. It is only necessary that both of the depicted carbon atoms are part of the same aromatic ring.

Preferred examples of the furazan oxides within the scope of Formula I useful in preparing the carbon black products of this invention are those that can be represented by the Formulae II-V.

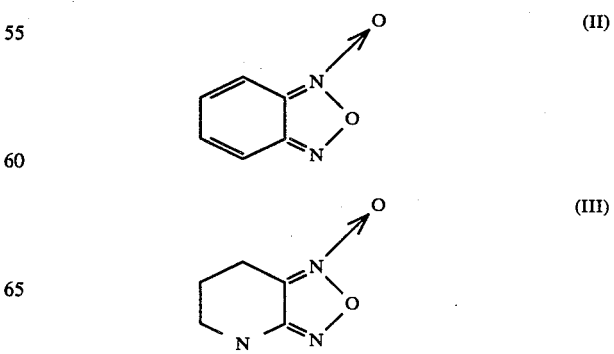

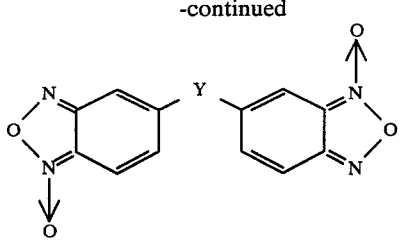

or

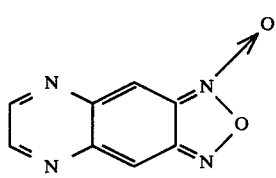

wherein none, one or any two of the ring positions can be substituted with lower hydrocarbyl, halogen, hydroxyl, lower hydrocarbyloxy, lower hydrocarbylthio, lower hydrocarbyl carbonyl, carbonyl lower hydrocarbyloxy, nitro, amino or amine groups and Y is a linking atom or group. In this context, lower hydrocarbyl refers to groups containing carbon and hydrogen having 8 or less carbon carbon atoms such as methyl, ethyl, butyl, pentyl, heptyl, octyl (all isomers). Linking atoms or groups Y include ether, thio ether, sulfoxide, sulfone, amine, methylene and the like (including a simple covalent bond such as found in biphenyl) and the other linking groups shown in U.S. Pat. No. 3,528,098 (which is incorporated by reference herein for its disclosures in the regard). Hydrocarbyloxa, hydrocarbylthia and mixed hydrocarbyloxathia substituents are also possible where the hydrocarbyl groups are typically lower alkylene moieties. Such are often made from glycols, dithiols, epoxides and episulfides. Often the furazan oxide is a benzofurazan oxide of the formula

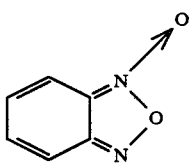

wherein none, one or any two of the ring positions can be substituted with lower hydrocarbyl, halogen, low hydrocarbyloxy, lower hydrocarbylthio, lower hydrocarbyl carbonyl, carbonyl lower hydrocarbyloxy, nitro, amine or amino groups. Typically, the furazan oxide is benzofurazan oxide or the methyl or methoxy analog thereof.

Methods for preparing, purifying and handling these compounds are known to the art as is shown by the references cited hereinabove. The preparation of halogenated benzofurazan oxides and other substituted derivatives is described by Boulton et al in *J. Chem. Soc.* (1965) 5958. Benzotri (furazan oxide) can be prepared by the method described by Barley and Case in *Tetrahedron*, 3 (1958) 113. It should be noted that some of these furazan oxides, particularly those containing relatively large amounts of nitrogen and oxygen, such as benzotri (furazan oxide) and 4,6-di(nitro)benzofurazan oxide, are prone to rapid decomposition to the point of explosions; all may be physiologically active to varying degrees. Therefore, care in their handling and use should be exercised.

The carbon black and furazan oxides are mixed in any suitable manner. For example, when the carbon black is an unpelletized flocculant mass, the carbon black and furazan oxide can be introduced into a container, heated to a temperature above the melting point of the furazan oxide, and then rotated until the carbon black and furazan oxide are completely intermixed. When the mixing procedure is completed, the resulting mixture is heated in an oven generally yielding a homogeneous mixture of the carbon black and furazan oxide. The nature of the bond between the carbon black and the furazan oxide is not known with any certainty, and the bond may be a physical or a chemical bond or a mixture of physical and chemical bonds.

When it is desired to have the carbon black product of the invention in pelletized form, the carbon black and furazan oxide can be admixed (optionally with the liquid materials normally used in pelletizing operations) and thereafter formed into pellets of the desired size under pelletizing conditions followed by heating. Pelletizing aids such as molasses and the like which are conventionally employed can also be used in the preparation of the carbon black products of the invention.

As mentioned, whether the carbon black product of the invention is prepared in flocculant or pelletized form, the product formed by mixing of the carbon black and furazan oxide is heated in suitable equipment at elevated temperatures up to the decomposition temperature of the particular furazan oxide. Generally, temperatures of from about 100° to 150° C. are satisfactory, and the heating period may be from about one hour depending on the particular temperature selected.

The amount of furazan oxide combined with the carbon black to form the carbon black products of the invention may vary over a wide range. Generally, amounts of furazan oxide up to about 10% by weight, based on the weight of the carbon black have been found to be sufficient to provide the carbon black products having the desired characteristics to be utilized in the preparation of vulcanized rubbers having desirable properties.

The carbon black products of the invention are useful, as mentioned above, in improving the properties of rubber compositions. Thus, the carbon black products of the invention are added to and incorporated into uncured, unvulcanized rubber compositions. In some instances, the rubber compositions will contain curing agents (systems) and are thus capable of being cured or vulcanized. In other instances, the rubber compositions into which the carbon black products of the invention are incorporated do not contain curing agents, either because they are intermediate compositions to which a curing system will be added or because they are to be used without the addition of curing agents in such applications as sealants, caulks, adhesives and the like. In any event, the invention includes uncured rubber compositions containing the carbon black products of the invention whether or not they contain, in addition, curing agents, and whether or not they are intermediates to which curing agents are to be added.

When curing agents are present, they are the conventional types such as sulfur- or peroxide-based curing systems. They are used in conventional amounts and incorporated in the uncured compositions of this invention by known techniques and procedures. Fillers (pigments other than carbon black) may be, and often are present as is known to those skilled in the art. Typical fillers include glass, silica, talc and similar finely divided mineral materials.

The term "rubber" as used herein includes natural as well as synthetic rubbers, and the rubber compositions of the present invention include both natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention preferably have unsaturated carbon chains. That is, their polymer backbones contain a significant amount of unsaturation, in contast to the pendant or vinyl saturation found in some other types of rubbers. Typically, the chains of such unsaturated rubbers have at least about 20% of their carbon-to-carbon bonds as unsaturated bonds. Characterization of rubber as having unsaturated carbon chains it well-known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BIIR—Bromo-isobutene-isoprene
BR—Butadiene
CIIR—Chloro-isobutene-isoprene
CR—Chloroprene
IIR—Isobutene-isoprene
IR—Isoprene, synthetic
NBR—Nitrile-butadiene
NCR—Nitrile-chloroprene
NIR—Nitrile-isoprene
NR—Natural rubber
PBR—Pyridine-butadiene
PSBR—Pyridine-styrene-butadiene
SBR—Styrene-butadiene
SCR—Styrene-chloroprene
SIR—Styrene-isoprene rubbers Of these, the NR, IR, BR, SBR, CR, CIIR, NIR or mixtures of two or more of these are typically used. Many compositions are made wherein the rubber is NR, SBR or a mixture containing at least about 50% of one of these. Compositions containing only NR as the rubber portion are often used. In the context of this invention, NR includes both hevea and guayule rubber as well as mixtures thereof.

The rubber compositions of the invention also can contain materials used in conventional rubber formulations such as antioxidants, accelerators, retarders, promoters and the like in addition to the curing systems and fillers noted above. It should be noted, however, that it is sometimes desirable to choose such materials with care since they may interact with the essential furazan oxides.

The rubbers of another aspect of this invention, that relating to vulcanizates (i.e., cured stocks) are essentially the same as those described above.

The vulcanizates of the present invention also may contain fillers of the conventional type such as clays, talc, pyrophyllite, silica and other inorganic, finely divided materials. In addition, they contain conventional curing systems and agents, such as sulfur, antioxidants, accelerators, retarders, coupling agents, promoters and the like.

The vulcanizable compositions containing the carbon black products of the present invention can be prepared by conventional techniques using various types of mills, blenders and mixers known to the art. The cured compositions can be made by the same techniques followed by curing. Usually the amount of furazan oxide incorporated into the vulcanizable composition as part of the carbon black product is a property-improving amount, such as an amount which will improve the processability of the composition. Processability properties are those related to the ease and efficiency of mixing, mastication and handling of a rubber composition in its unvulcanized, that is, uncured state. They include viscosity and often the speed and efficiency with which various other components are dispersed in the rubber. Similar amounts are used in the cured compositions to improve such vulcanizate properties as filler interaction, modulus, resiliency, hysteresis, rolling resistance, running temperature and the like. Typically, this property-improving amount of the furazan oxide will range from about 0.1 to 10 parts per 100 parts (by weight) rubber (phr). Often the furazan oxide will be incorporated in an amount ranging from 0.5-5 phr.

The temperature used in formulating the rubber compositions of this invention are those normally used in the art, and generally will be a temperature of at least about 140° C. depending on the particular elastomer being processed. In its broader aspects, the formulations can be made from about 140° to 220° C. Because of the shear forces involved in formulating the rubber compositions, the formulation process is exothermic and high temperatures are normal. As noted hereinabove, fillers, promoters, curing agents and other conventional rubber additives are also often included in these uncured mixtures in conventional amounts.

The vulcanizates of this invention are prepared by curing the compositions containing the carbon black product under conditions of temperature and time customarily used in the art, and the invention is not significantly dependent on such curing variables. Typically the rubber carbon black product and other fillers (or pigment) are mixed and then the mixture is cured. Other mixing sequences can also be used, but it is essential to have the rubber and carbon black product intimately combined before vulcanization.

Among the desirable and beneficial properties exhibited by the rubber compositions of the present invention prepared with the carbon black products of the invention are improved processability, enhanced green strength and generally, reduced viscosity. Compositions containing substantial amounts (greater than 50%) of NR, IR or CR show improved processability. Improved processability of uncured rubber formulations is desirable because it permits savings in energy and time while compounding and subsequent processing of the rubber by techniques such as calendering, milling, re-milling, extrusion and the like. Such savings are important in the current period of shortages and rising costs. In general, processability is an inclusive term used also to describe the decreased viscosity and/or high green strength such as found in the compositions of this invention. Heretofore, it has often been found that decreasing viscosity of an uncured composition also results in decreased green strength. Similarly, increasing green strength has been found to increase viscosity. It is a particularly desirable feature of the compositions of the present invention that viscosity reductions are achieved in combination with green strength increases.

In general, NR, IR and CR containing compositions show viscosity reductions of about 20 Mooney units for about 0.5–1.5 phr furazan oxide with accompanying increases in green strength of about 20–100 psi. Similar levels of furazan oxide in synthetic rubbers such as, for example, SBR show Mooney viscosity increases of about 10 units while when peak green strength is increased about 5–50 psi. With higher levels of furazan oxides (e.g., 2–5 phr), the extreme in viscosity reduction can be reached with liquefaction of NR and IR. Such liquid rubbers are useful in sealants and as processing aids where they are combined with other types of rubber to aid in plasticizing rubber. Liquid rubbers, also known as depolymerized rubber (DPR), are well-known in the art and need not be further described here. It is sometimes found that the viscosity reductions observed in the compositions of the present invention are accentuated by the inclusion of antioxidants and materials such as carbon black which are believed to interact and trap polymer free radials prior to their cross-linking. Thus maximum viscosity reductions can usually be achieved by adjusting the concentrations of the furazan oxide, carbon black, and the antioxidant or radial trapping materials (fillers) in a given rubber composition.

EXAMPLES

The following, nonlimiting examples exemplify the practice of the invention and include the best mode presently known. In these examples, as elsewhere in the specification and claims, all parts and percentages are by weight (pbw), unless specified otherwise, and temperatures are in degrees centigrade. Conventional rubber compounding materials, conditions, temperatures, procedures and evaluation techniques are used unless noted to the contrary. Examples 1–5 illustrate the preparation of the carbon black products of the invention, and Examples A and B illustrate some of the various rubber compositions of this invention utilizing the carbon black product of the invention.

EXAMPLE 1

A mixture of 150 parts of a HAF unpelletized carbon black (ASTM 1765 Designation N-339) and 6.2 parts (4% by weight) of benzofurazan oxide is prepared in a 28-ounce beverage bottle, and the bottle is rotated in a water bath maintained at 80° C. for a period of about 16 hours. The bottle then is placed in an oven maintained at 120° C. for an additional 4 hours. The resulting blend is a homogeneous mixture of the furazan oxide and carbon black which does not have the characteristic furazan oxide odor.

EXAMPLE 2

A mixture of about 100 parts of an ISAF carbon black (N-220) and 5 parts of benzofurazan oxide is prepared in a 28-ounce beverage bottle. The bottle is rotated in a water bath maintained at 80° C. for a period of about 16 hours and thereafter the bottle is placed in a static oven for about 4 hours at a temperature of 125° C. The desired carbon black product is obtained.

EXAMPLE 3

A mixture of about 100 parts of an ISAF carbon black (N-220) and 5 parts of 6-methyl benzofurazan oxide (MBFO) is prepared in a 28-ounce beverage bottle. The bottle is rotated in a water bath maintained at 80° C. for a period of about 16 hours and thereafter the bottle is placed in a static oven for about 4 hours at a temperature of 125° C. The desired carbon black product is obtained.

EXAMPLE 4

The procedure of Example 1 is repeated except that the carbon black used is an SRF black, N-660.

EXAMPLE 5

The procedure of Example 2 is repeated except that the carbon black used is an SAF black, N-110.

MASTERBATCH PREPARATION

In the following examples, an internal mixer, such as a Brabender or small size Banbury mixer, is used. The usual technique is to add various materials, often in portions, to the mixer and continue mixing for the indicated time period. Further additions followed by mixing are then made to the masterbatches thus prepared. The standard technique is according to the following schedule:

| Time, (Min.) | Add to Mixer |
|---|---|
| 0 | Polymer, 100 parts |
| .5 | Half charge carbon black product |
| 1.5 | Balance carbon black product plus zinc oxide, stearic acid |
| 3.0 | Processing oil |
| 6.0 | Drop mixed composition at 360° F. |

The uncured masterbatch is then immediately banded and sheeted on a small twin roll mill set at 60 gauge. Mooney viscosities are measured using the large rotor in a four minute cycle at 100°. This procedure is used to make masterbatches from NR (Hevea) and SBR (trade name Duradene, available from The Firestone Tire & Rubber Company, Akron, Ohio, U.S.A.).

EXAMPLE A

A SBR-based passenger tire tread stock formulation (control) is prepared containing about 60 phr HAF carbon black and conventional amounts of zinc oxide, stearic oxide and a waxy antioxidant. A similar formulation containing 24 phr of the carbon black product of Example 1 (BFO treated) in lieu of the 60 parts of HAF black is prepared.

The formulations are cured at about 150° C., and the physical properties of both cured formulations are measured. The results of the measurements are summarized in the following Table II.

TABLE II

| | Control | Example A |
|---|---|---|
| Monsanto Rheometer (150° C.) | | |
| TS(2) | 13.3 | 15.0 |
| TC(90) | 21.8 | 21.4 |
| Ring Stress-Strain | | |
| 300% Modulus | 1881 | 2150 |
| Tensile | 2782 | 2485 |
| % Elongation | 400 | 334 |
| Rebound (%) | | |
| At 73° F. (22° C.) | 42 | 49 |
| At 212° F. (100° C.) | 63 | 67 |
| MTS Tan δ (R.T.) | 0.193 | 0.152 |
| Firestone Flexometer (250 lbs, 0.3" throw) | | |
| % Deflection | 17.3 | 17.3 |
| Running Temperature (°F.) | 251 | 240 |

EXAMPLE B

A natural rubber (NR) composition (control) is prepared containing about 60 parts ISAF black, about 15 parts of Hi-sil silica and conventional amounts of zinc oxide, antioxidant. Two essentially identical compositions are prepared except that the 60 parts of ISAF black are replaced by the carbon black product of Examples 2 and 3. The amount of the carbon black products included in these formulations is an amount sufficient to provide a benzofurazan oxide content of 1 phr. The three formulations are cured at about 150° C., and some of the physical properties of the cured formulations are evaluated. The results are summarized in Table III.

TABLE III

|  | Carbon Black Product | | |
| --- | --- | --- | --- |
|  | None (Control) | BFO[a] | MBFO[b] |
| Mooney viscosity (100° C.) | 77 | 58 | 57 |
| Ring Tensile (73° F.) | | | |
| 300% Modulus | 2510 | 2424 | 2487 |
| Tensile | 3201 | 3150 | 3234 |
| Elongation | 358 | 363 | 365 |
| MTS Tan δ (R.T.)[c] | 0.127 | 0.092 | 0.099 |

[a]Product of Example 2.
[b]Product of Example 3.
[c]Measured using large rotor and a 4-minute cycle.

As can be seen from Table III, the stocks containing the carbon black products of the invention exhibit decreased Mooney viscosities.

It also has been observed that the use of the carbon black products of this invention in rubber compositions generally results in smaller loses in tear strengths when compared to rubber compositions containing carbon black and separate addition of furazan oxide. In other words, the carbon black compositions of the invention are more effective in limiting the tear strength loss due to the inclusion of furazan oxides than when the carbon black and furazan oxides are added separately to the rubbers.

The vulcanizable rubber compositions of this invention resulting from the use of the carbon black products of the invention can be molded or shaped into the desired shapes by known techniques, and they can be used for many purposes for which similar compositions are used. For example, they can be used for tire tubes, tire treads, tire casings, shoe soles and heels, raincoats, table covers, hose for transmission of fluids, belts, printer rolls, printer's blankets. engraving plates, battery cases, etc. The use in tire stock is particularly preferred.

While the invention has been described and exemplified herein by reference to specific materials, machinery, techniques, procedures and examples, it is understood that it is not restricted to any of these numerous variations, combinations, and permutations can be made within the scope of the invention as is clear to those skilled in the art.

I claim:

1. A carbon black product useful in rubber compositions prepared by heating a mixture which comprises carbon black having a surface area of at least 20 m²/g. and up to 10% by weight, based on the weight of carbon black, of at least one aromatic furazan oxide of the partial formula

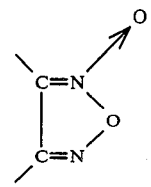

wherein the depicted carbon atoms are a part of a single fused aromatic ring at a temperature of from at least the melting point up to the decomposition of the furazan oxide.

2. The carbon black product of claim 1 wherein the furazan oxide is of the formula

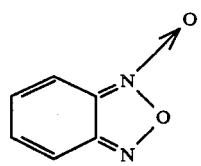

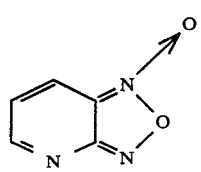

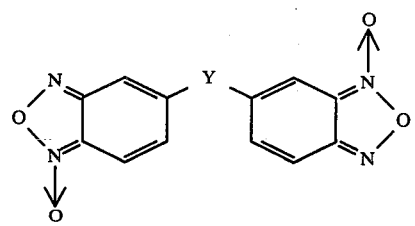

or

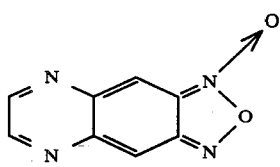

wherein none, one or any two of the ring positions can be substituted with lower hydrocarbyl, halogen, hydroxyl, lower hydrocarbyl oxy, lower hydrocarbyl thio, lower hydrocarbylthia-, -oxa, and -thia, -oxa, lower hydrocarbyl carbonyl, carbonyl lower hydrocarbyl oxy, nitro, amine or amino groups and Y is a linking atom or group.

3. The carbon black product of claim 1 wherein the furazan oxide is of the formula

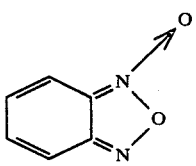

wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups.

4. The carbon black product of claim 1 wherein the furazan oxide is a benzofurazan oxide or the methyl or methoxy analog thereof.

5. The carbon black product of claim 1 wherein the aromatic furazan oxide is adsorptively bound to the carbon black.

6. The carbon black product of claim 1 in pelletized form.

7. An uncured rubber composition comprising at least one rubber having an unsaturated carbon chain and a minor, property-improving amount of a preformed carbon black product prepared by heating a mixture comprising a mixture of carbon black having a surface area of at least 20 m²/g. and up to about 10% by weight, based on the weight of the carbon black of at least one aromatic furazan oxide of the partial formula

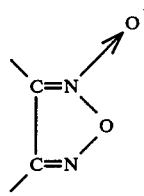   (I)

wherein the depicted carbon atoms are part of a single fused aromatic ring at a temperature of from at least the melting point up to the decomposition of the furazan oxide.

8. The rubber composition of claim 7 wherein the rubber is NR, IR, BR, SBR, CR, CIIR, NIR or a mixture of two or more said rubbers.

9. The rubber composition of claim 7 wherein the rubber is NR, SBR or a mixture containing at least about 50% of one of these.

10. The rubber composition of claim 7 wherein the furazan oxide is of the formula

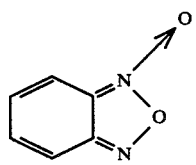   (II)

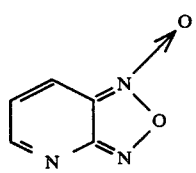   (III)

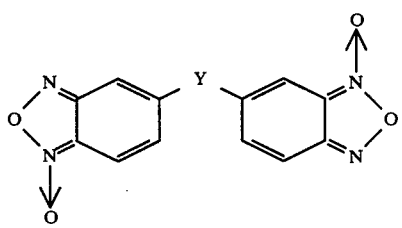   (IV)

-continued
or

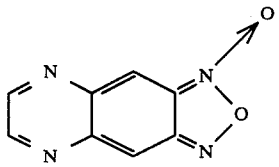   (V)

wherein none, one or any two of the ring positions can be substituted with lower hydrocarbyl, halogen, hydroxyl, lower hydrocarbyl oxy, lower hydrocarbyl thio, lower hydrocarbylthia-, -oxa, and -thia, -oxa, lower hydrocarbyl carbonyl, carbonyl lower hydrocarbyl oxy, nitro, amine or amino groups and Y is a linking atom or group.

11. The rubber composition of claim 7 wherein the furazan oxide is of the formula

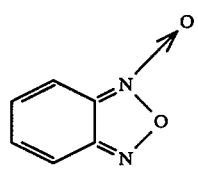   (VI)

wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups.

12. The rubber composition of claim 7 wherein the furazan oxide is a benzofurazan oxide or the methyl or methoxy analog thereof.

13. The rubber composition of claim 7 wherein the preformed carbon black product is in pelletized form.

14. A method of improving the processability and/or reducing viscosity of uncured rubber compositions containing at least one rubber having unsaturated carbon backbone chains which comprise including in the composition an effective amount of a preformed carbon black product prepared by heating a mixture comprising carbon black having a surface area of at least 20 m²/g. and up to about 10% by weight, based on the weight of the carbon black, of at least one aromatic furazan oxide of the partial formula

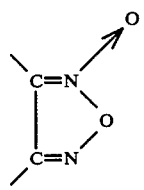   (I)

wherein the depicted carbon atoms are part of a single fused aromatic ring at a temperature of from at least the melting point up to the decomposition of the furazan oxide.

15. The method of claim 14 wherein the furazan oxide is a benzofurazan oxide of the formula

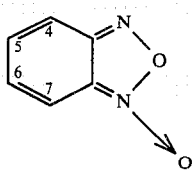

wherein none, one or any two of the ring positions 4, 5, 6 or 7 can be substituted with lower hydrocarbyl, hydroxyl halogen, lower hydrocarbyloxy, lower hydrocarbylthio, lower hydrocarbyl carbonyl, carbonyl lower hydrocarbyloxy, nitro, amine, or amino groups with balance substituted with hydrogen atoms, and Y is a linking atom or group.

16. The method of claim 14 wherein the rubber is NR, IR, BR, SBR, CR, CIIR, NIR or a mixture of two or more of said rubbers, and curing agent present.

17. A method of enhancing the processability of NR, SBR, or IR, or mixtures containing at least one thereof, according to claim 15.

18. A filled vulcanizate made by vulcanizing a composition comprising at least one rubber having an unsaturated carbon chain, and a minor, property-improving amount of preformed carbon black product prepared by heating a mixture comprising carbon black having a surface area of at least 20 m²/g. and up to about 10% by weight, based on the weight of the carbon black, of at least one aromatic furazan oxide of the partial formula:

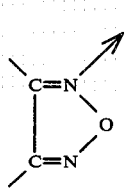
(I)

wherein the depicted carbon atoms are part of a single aromatic ring at a temperature of from at least the melting point up to the decomposition of the furazan oxide.

19. The vulcanizate of claim 18 wherein the rubber is NR, IR, BR, SBR, CR, CIIR, NIR or a mixture of two or more said rubbers.

20. The vulcanizate of claim 18 wherein the rubber is NR, SBR or a mixture containing at least about 50% NR and the vulcanizate also contains a silica filler.

21. The vulcanizate of any one of claims 18–20 wherein the furazan oxide is of the formula

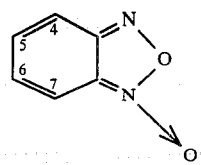

wherein none, one or any two of positions 4, 5, 6 or 7 can be substituted with lower hydrocarbyl, halogen, lower hydrocarbyloxy, lower hydrocarbylthio, lower carbonyl, carbonyl hydrocarbyloxy, nitro, amino or amine groups, and Y is a linking atom or group.

22. The vulcanizate of claim 21 wherein the furazan oxide is benzofurazan oxide or a methyl or methoxy analog thereof.

23. A tire having at least a portion thereof made of the vulcanizate of claims 18 or 19.

24. A tire having at least a portion thereof made of the vulcanizate of claim 18, said vulcanizate comprising NR or a mixture containing at least 50% NR.

25. A method of reducing the rolling resistance of a tire which comprises making the tread portion of the tire from a vulcanizate of any one of claims 18–20.

26. A method of promoting rubber-filled interaction in a filled vulcanizate comprising at least one rubber having an unsaturated carbon chain and carbon black filler which comprises including in the vulcanizable compositions from which the vulcanizate is prepared, a minor, filler-interaction-promoting amount of a preformed carbon black product prepared by heating a mixture comprising carbon black having a surface area of at least 20 m²/g. and up to about 10% by weight, based on the weight of the carbon black, of at least one aromatic furazan oxide of the partial formula

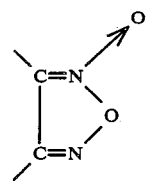
(I)

wherein the depicted carbon atoms are part of a single aromatic ring at a temperature of from at least the melting point up to the decomposition of the furazan oxide.

* * * * *